US 6,707,907 B1

(12) United States Patent
Guzman et al.

(10) Patent No.: US 6,707,907 B1
(45) Date of Patent: Mar. 16, 2004

(54) DIGITAL-CROSS-CONNECT SYSTEM SINGLE ELEMENT RESTORATION TECHNIQUE

(75) Inventors: Richard L. Guzman, Holmdel, NJ (US); Eric C Lohff, Cumming, GA (US); Barbara E Walsh, Woodstock, GA (US); Marcus L White, Suwanee, GA (US); Ihor J. B. Wynarczuk, Carol Stream, IL (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/157,222

(22) Filed: Sep. 18, 1998

Related U.S. Application Data

(60) Provisional application No. 60/060,276, filed on Sep. 29, 1997.

(51) Int. Cl.[7] .................................................. H04M 3/10
(52) U.S. Cl. .................. 379/279; 379/292; 379/221.03
(58) Field of Search .................... 379/279, 291, 379/292, 306, 335, 221.03

(56) References Cited

U.S. PATENT DOCUMENTS

| 5,420,917 | A | | 5/1995 | Guzman |
| 5,459,716 | A | * | 10/1995 | Fahim et al. ................ 370/228 |
| 5,619,562 | A | * | 4/1997 | Maurer et al. ......... 379/201.05 |
| 5,623,541 | A | * | 4/1997 | Boyle et al. ........... 379/221.15 |
| 6,215,867 | B1 | * | 4/2001 | Eslambolchi ................ 379/229 |

* cited by examiner

Primary Examiner—Ahmad F. Matar
Assistant Examiner—Rasha S Al-Aubaidi

(57) ABSTRACT

Restoration of an inoperative network element (12) such as a digital cross-connect system is accomplished by receiving updates from each element as they occur in a local controller network (18). The local controller network forwards the updates to a DCS-Operations support system (22) that generates a restoration map for each element in its native language, and thereafter updates each map upon receipt of each update. In response to a user command, the DCS-operation system directs (transmits) the update map either to directly the inoperative element or to an intermediate element to achieve restoration.

8 Claims, 5 Drawing Sheets

DIGITAL-CROSS-CONNECT SYSTEM SINGLE ELEMENT RESTORATION TECHNIQUE

RELATED APPLICATIONS

This application claims priority to Provisional U.S. Patent Application Serial No. 60/060,276, filed Sep. 29, 1997.

TECHNICAL FIELD

This invention relates to a technique for restoring cross-connection information in a digital cross-connect system.

BACKGROUND ART

Most present-day telecommunications networks typically include one or more Digital Cross-Connect Systems (DCSs) for electronically cross-connecting various incoming trunks to selected outgoing trunks in much the same way as a telecommunications switching system. With a DCS, the connections are set up in advance of the call, and typically remain in place thereafter until such time as a technician alters such connections to de-provision old service and/or provision new service. In some instances, the DCS connections become lost when the DCS becomes inoperative due to a disaster, such as a fire, flood, earthquake, or explosion. Moreover, during certain types of maintenance operations, a telecommunications service provider may purposely remove a DCS from service, causing a loss of such connections. Restoration of service requires that the cross-connections be restored, either by restoration of DCS itself, or by replicating the cross-connections on another DCS.

Restoration of the DCS cross-connections is usually a time-consuming operation. In case of a disaster, spare DCS capacity may no longer exist on site. Under such circumstances, one or more restoration DCSs must be transported to the disaster site. Thereafter, technicians must replicate the cross-connections on the restorations DCSs. U.S. Pat. No. 5,420,917, "Automated Recovery of Telecommunications Network Elements", issued on May 30, 1995, in the name of Richard Guzman, and assigned to AT&T Corp., the assignee of the present invention, describes a method for automated restoration of one or more inoperative DCSs in a telecommunications network. In accordance with the teachings of the '917 patent (herein incorporated by reference), restoration of one or more inoperative DCSs is accomplished by first connecting the restoration DCSs through guided media, in the form of cables, radio channels or the like, to the inoperative DCSs. Thereafter, the profile of each inoperative DCS (i.e., its cross-connection data) is obtained from a network database, referred to as the DCS Operation Support System (DCS-OSS) that stores circuit orders (cross-connect data) in a state database (SDB). A technician then translates the cross-connections needed to restore the each inoperative DCS into a circuit map in accordance with the cross-connect capability of each restoration DCS. The circuit map is ported to the restoration DCSs and is thereafter executed by such DCSs to restore service.

While the restoration technique disclosed in the '917 patent is effective, the technique nevertheless suffers from the drawback that the profile of each inoperative DCS may not always be accurate. In practice, the profile for each DCS is obtained by periodically reconnoitering that DCS. Depending on the traffic it carries and its location, a DCS may only be reconnoitered no more often than every six months. Between such six-month intervals, a telecommunications network service provider will likely re-provision a DCS to alter its cross-connections to add, remove or modify service. Hence, there is a significant likelihood that the stored profile for a given DCS will not include such recent provisioning information. Hence, that restoration of a DCS using its stored profile often did not result in a complete restoration of all service. Moreover, manual extraction of the circuit mappings and subsequent translation into a format appropriate for a particular DCS often took significant time. Thus, not only were the restoration mappings potentially inaccurate, but such mappings took significant time to acquire.

Thus, there is need for a technique for achieving network restoration that overcomes the disadvantages of the prior art.

BRIEF SUMMARY OF THE INVENTION

Briefly, in accordance with the invention, a method is provided for restoring a network element, such as a Digital Cross-connect system (DCS) in case such element loses its circuit mappings. In accordance with the invention, updates from network elements indicative of a change in each network element's configuration, i.e., a change in the element cross-connections, are received at a local controller network. A restoration map is then established for each network element in a language corresponding to that element by a DCS Operation Support System (DCS-OSS) for storage in a database associated with the DCS-OSS. In case of the need to restore a selected element, the database is queried to obtain the map for the selected element. Thereafter, the map for the selected network element is appropriately directed (communicated) to effect restoration. In some instances, the map is directed to the selected element itself. In other instances, the restoration map is directed to an intermediate network element (e.g., a DCS in a laboratory environment) having the same configuration. From the intermediate element, a technician can generate a restoration map on a storage medium, such as a floppy disk, for example, for subsequent transfer to the selected element. Alternatively, the map may be directed to a target network element on which the service is restored in place of the selected element. Upon receipt of the restoration map, restoration is accomplished via the target element.

DETAILED DESCRIPTION

Figure 1:
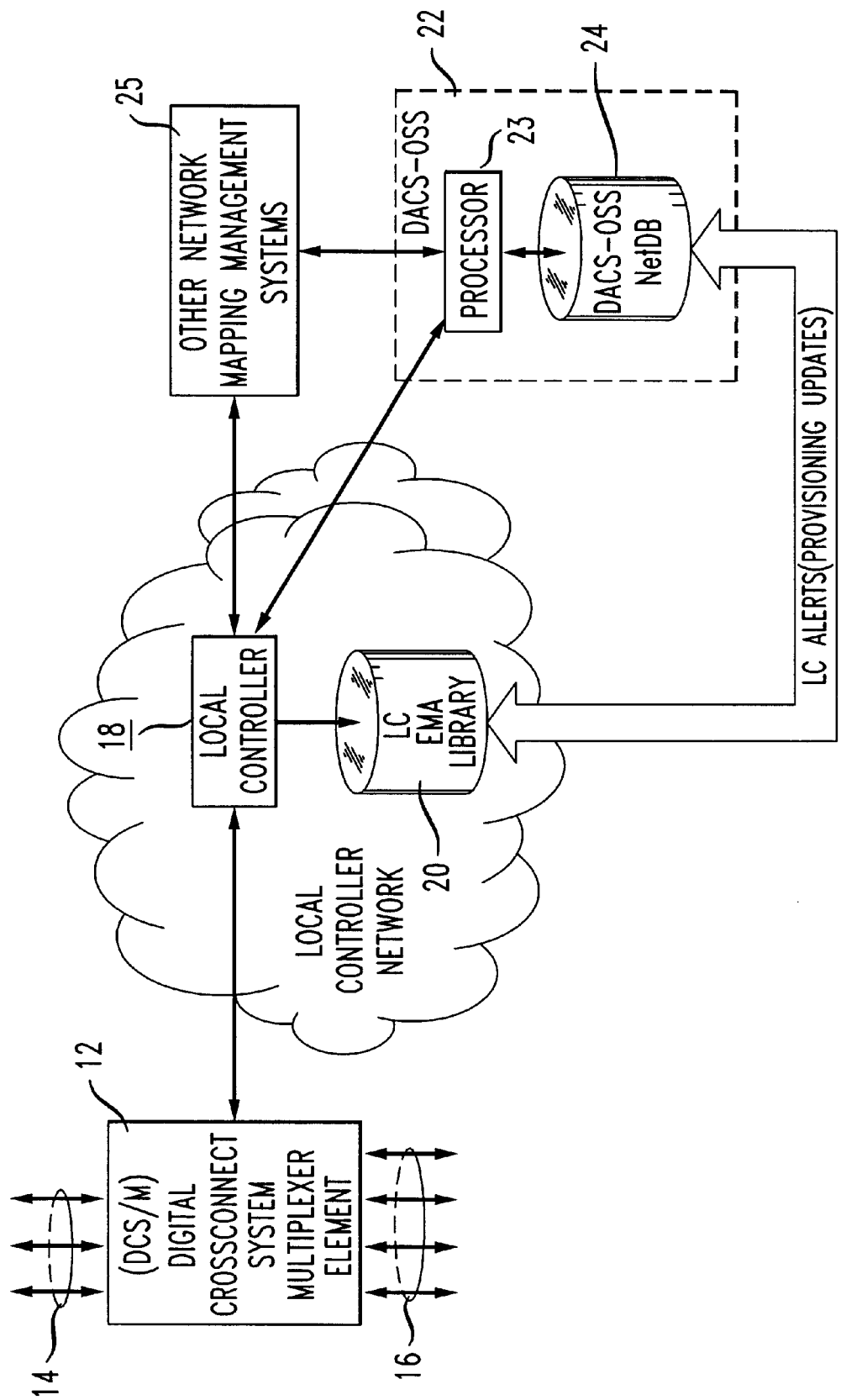
FIG. 1 is a block schematic diagram of a system for obtaining update information for elements in a network and for generating restoration maps in accordance with the invention.

FIG. 1 illustrates a block schematic diagram of a portion of a telecommunications network 10 that includes at least one network element 12. In the illustrative embodiment, the element 12 comprises Digital Cross-connect system (DCS) known in the art. The DCS 12 provide cross-connections (circuits) between selected ones of trunks 14 and 16. The trunks 14 and 16 may carry DS1, sub DS1, Intermediate Bit Rate, sub-rate, 2-point and multi-point circuits. Alternatively, the element 12 could comprise a SONET/ SDH Add/Drop Multiplexer (ADM) (not shown) that has cross-connect capability and equippage data (i.e., circuit pack information). Such ADMs can carry signals at trunk rates of DS3, OC3 or OC12 while transmitting signals at rates of OC-48 or higher.

As taught in co-pending U.S. patent application Ser. No. 08/926,614, filed Sep. 10, 1997 and assigned to AT&T (incorporated by reference herein), a Local Controller (LC) network 18, such as a LAN, couples the DCS 12 to a Local Controller Electronic Message Alert (LCEMA) Library (e.g., storage facility) 20. In turn, the LCMEA 20 is connected to a DCS Operation Support System (DCS-OSS) 22 that includes a processor 23 and an associated database 24. The LC 18 network receives each provisioning update made to each network element, such as the DCS 12, in real time and thereafter supplies that provisioning update to the LCEMA library 20 for subsequent transfer to the DCS-OSS 22. (Under some circumstances, the LC network 18 could provide the provisioning updates directly to the DCS-OSS 22 rather than store such information in the LC EMA library 20.)

In practice, the telecommunication network service provider responsible for the DCS 12 will provision it by modifying the cross-connections to add, delete or modify service for one or more subscribers. As each provisioning change is made to the DCS 12, the LC network 18 communicates that change to the LCEMA library 20. The LCEMA library 20 provides the provisioning updates (depicted as LC Alerts in FIG. 1) to the DCS-OSS 22 which as will be explained below creates and stores restoration maps. Each map represents configuration information descriptive of the cross-connections (circuits) needed to restore that DCS should it become inoperative. In response to a provisioning update received from the LC EMA library 20, the processor 23 within the DCS OSS 22 updates the map for each corresponding DCS. In accordance with invention, the processor 23 creates and updates the map in a language associated with the particular DCS. By doing so, the processor 23 can make available, in substantially real time, a restoration map for a particular DCS that is readily usable by that DCS, thus avoiding the need for subsequent translation, as was required previously. Additionally, the DCS-OSS 22 may also receive updates about a particular DCS from the LCEMA library 22 in response to information received through the LC network 18 from other network mapping and management systems, such as system 25. In response to updates from the system 25, the processor 23 within the DCS-OSS 22 also generates a new restoration map for each affected element.

In the past, the DCS-OSS 22 obtained the circuit map for a particular DCS by periodically reconnoitering that DCS to obtain its cross-connection information. However, such reconnoitering occurred infrequently, usually not more often than every six months. Thus, in the past, provisioning changes made between reconnoitering intervals were not normally made available to the DCS-OSS 22. Hence, reliance on the circuit information obtained only through reconnoitering each DCS was often insufficient to fully restore service.

However, as described in co-pending application Ser. No. 08/926,614 (incorporated by reference herein), the LC network 18 and LCEMA library 20 assure that the DCS-OSS 22 always receives the most up-to-date information about each DCS, such as DCS 12. As discussed above, the LC network 18 and LC EMA library 20 cooperate to provide the DCS-OSS 22 with real-time provisioning changes as each change is made to each DCS (or other network element). Thus, should a DCS, such as DCS 12, become inoperative, either because of a disaster, or because of planned maintenance, the DCS-OSS 22 can readily provide the most up-to-date map of the DCS cross-connects for restoration purposes. In this way, full service restoration can be achieved, even for provisioning changes made very shortly before the element became inoperative.

Figure 2:
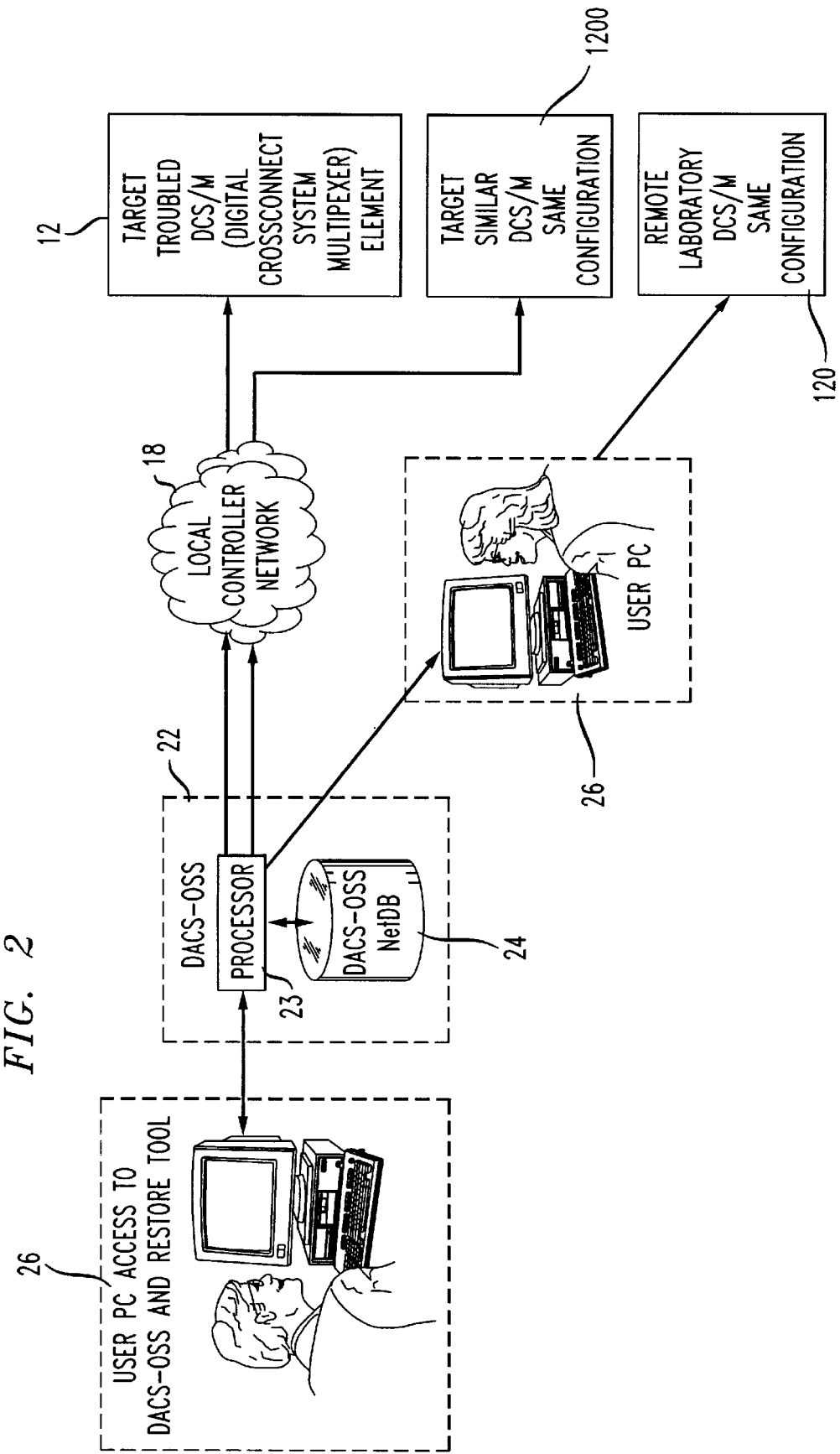
FIG. 2 illustrates the manner in which the system of FIG. 1 directs the restoration map to achieve network element restoration.

Referring now to FIG. 2, a user 26, such as a technician, can access the DCS OSS 22 and direct restoration maps to various different destinations in accordance with the invention. For example, the user 26 can direct (i.e., request transmission of) a restoration map for receipt on the user's own terminal, thus permitting the user to subsequently forward the map to a remote (laboratory) DCS 120 that has the same configuration as the inoperative DCS 12. Using the DCS 120, a technician can create a restoration program on a transportable storage medium, such as a floppy disk or the like, for transport to and loading on, the inoperative DCS 12.

Alternatively, the user 26 can request the DCS-OSS 22 to direct the restoration map to the inoperative DCS 12 directly. In response, the DCS-OSS 22 will transmit the restoration map via the LC network 18 to the inoperative DCS 12. Rather than direct the restoration map to the DCS 12, the user 26 can request that the DCS-OCS 22 transmit the map to a target DSC 1200 having the same configuration as and physically located in close proximity to, the inoperative DCS 12. Once loaded with the restoration map, the target DCS 1200 can now be placed in service to substitute for the inoperative DCS 12. With the restoration map for the inoperative DCS 12, the target DCS 1200 can itself restore service.

Figure 3:
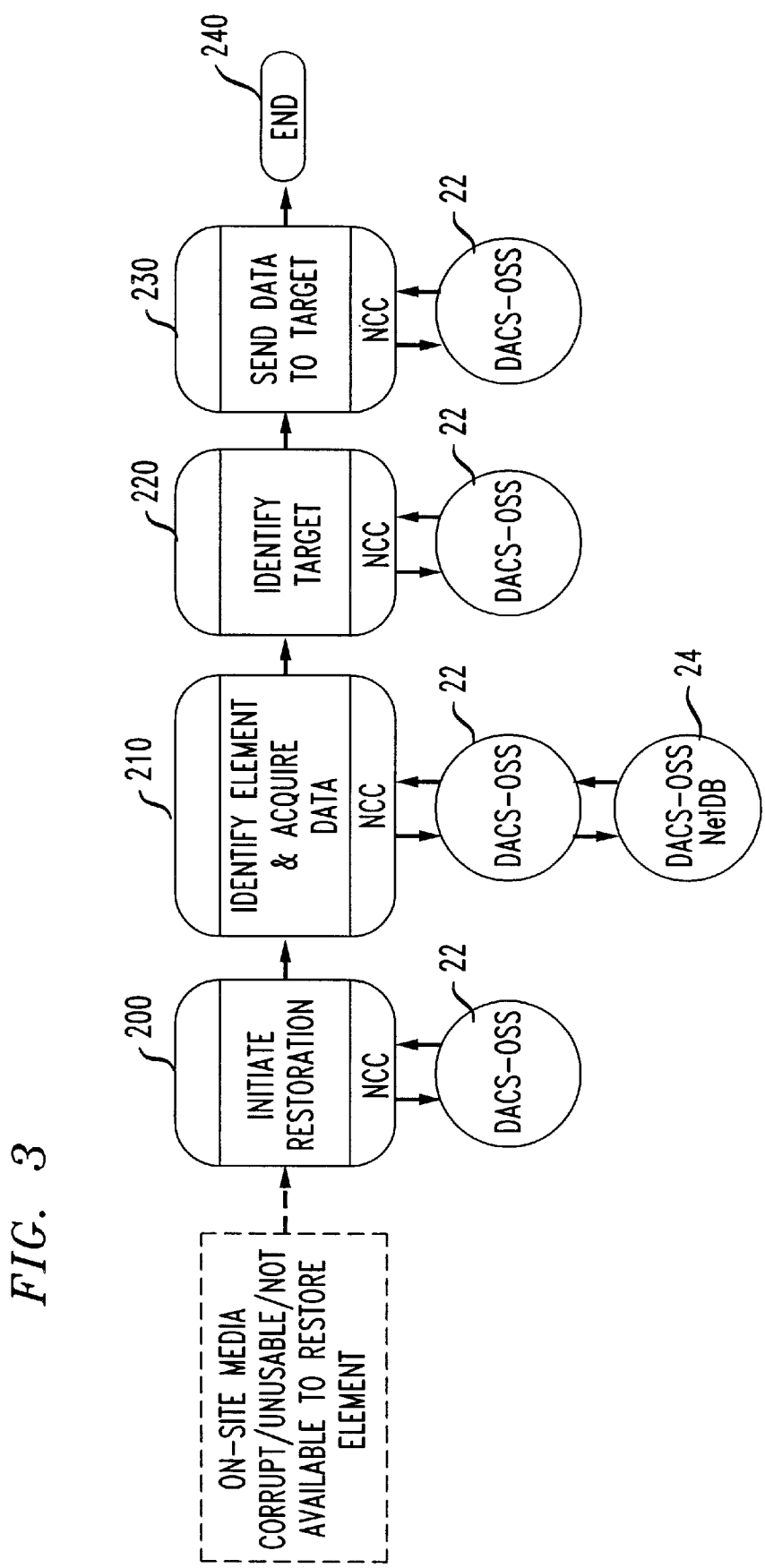
FIG. 3 illustrates in flowchart form the steps executed by the system of FIG. 1 to effect restoration in accordance with the invention.

FIG. 3 illustrates in flow-chart form the general steps associated with the restoration method of the invention. At the outset, the user 26 of FIG. 2 initiates the restoration process (step 200) by entering the appropriate command to the DCS-OSS 22. After initiating restoration, the user 26 of FIG. 2 then identifies the element, (e.g., the inoperative DCS 12 of FIG. 1) for which the restoration map is sought (step 210). In response to the identification of the element, the DCS-OSS 22 accesses its database 23 of FIGS. 1 and 2 to retrieve the restoration map for the identified element.

Once the DCS-OSS 22 has acquired the restoration map for the identified element, the user 26 will then issue a command to the DCS-OSS 22 identifying the destination for the restoration map (Step 220). In response, the DCS-OSS 22 sends the restoration map to the target (step 230) designated by the user as discussed previously with respect to FIG. 2. Thereafter, the restoration method ends (step 240).

Figure 4:
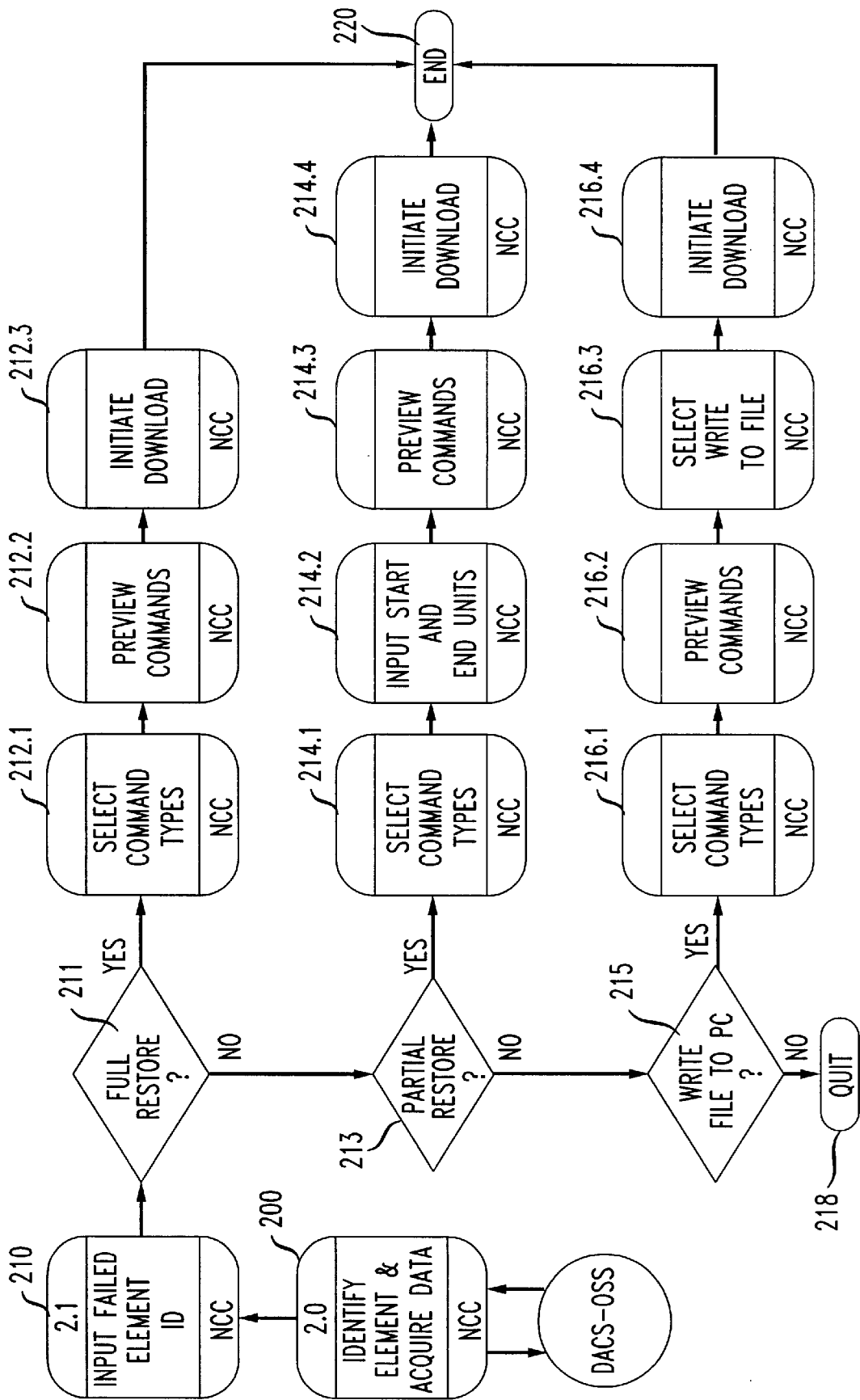
FIG. 4 illustrates in flowchart form the steps executed by the system of FIG. 1 to achieve different levels of restoration.

The restoration process of FIG. 3 advantageously allows the user 26 of FIG. 2 to initiate either partial or full restoration. In other words, the user may choose to restore all of the circuit connections or to restore a portion of such connections. FIG. 4 illustrates in flow-chart form the manner in which a user may effect either partial or full restoration. Following element identification during step 210, the user 26 of FIG. 2 is queried during step 211 of FIG. 4 to whether full restoration is desired. If the user selects full restoration during step 211, then the user is thereafter prompted to select among the various command types associated with full restoration (step 212.1). Thereafter, the user previews the command (step 212.2) before initiating downloading of the commands during step 212.3. Following step 212.3, program execution reverts to step 220.

If the user does not select full restoration during step 211 of FIG. 4, then the user is queried during step 213 whether partial restoration is desired. Should the user select full restoration during step 211, then the user is thereafter prompted to select the command types for partial restoration (step 214.1). Thereafter, the user inputs the desired start and end units (i.e., the selected sub-set of circuit connections) during step 214.2 before previewing the commands during step 214.3. Thereafter, the user initiates downing loading of the commands during step 214.4 before program execution branches to step 220.

If full or partial restoration is not selected during steps 211 and 213, respectively, then the user is prompted during step 215 whether to write the restoration map file to the user's terminal or personal computer (PC). Once the user has opted to write the file during step 215, the user is then prompted to select the command types associated with writing the file to the user's terminal or PC (step 216.1). Thereafter, the user previews the commands (step 216.2) before selecting the file for writing during step 216.3. Following step 216.3, the user initiates file downloading during step 216.4. Upon completion of step 216.4, program execution reverts to step 220.

Figure 5:
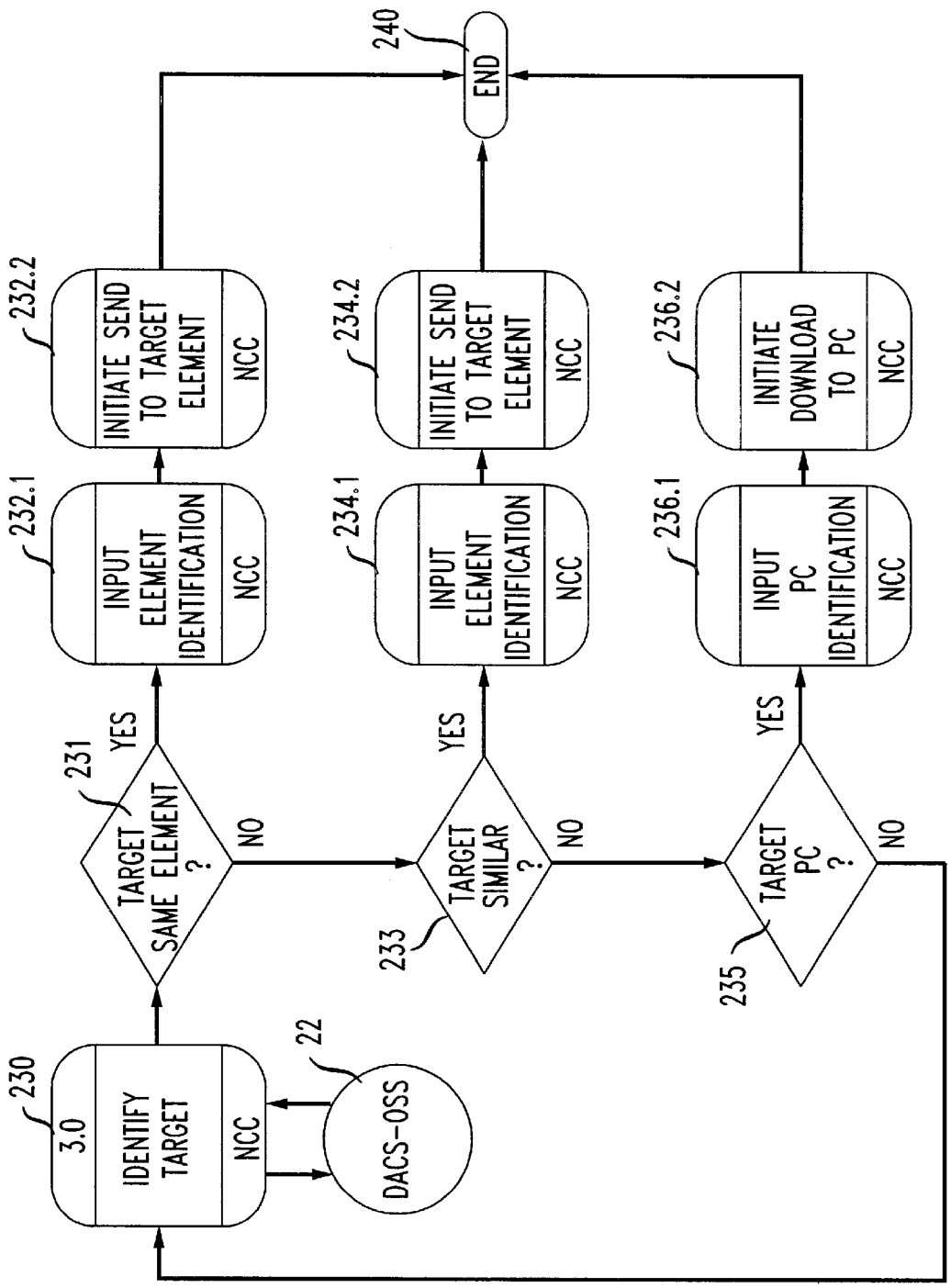
FIG. 5 illustrates in flowchart form the steps executed by the system of FIG. 1 to direct the restoration map to different targets.

As discussed above, a user may direct the restoration map to one of several destinations during step 230 of FIG. 2. FIG. 5 illustrates in flow chart form the steps associated with sending the restoration map to different destinations. Following step 230, the DCS-OSS system 22 of FIGS. 1 and 2 executes step 231 of FIG. 5 and determines whether the target identified during step 230 is the same as the element for which the restoration map was sought. If so, then following step 231, step 232.1 is executed and the user is prompted to confirm the element identification before the DCS-OSS system 22 initiates downloading during step 232.2. Thereafter, program execution branches to step 240.

If the DCS-OSS 22 of FIGS. 1 and 2 determines during step 231 that the target element is not the same, then the DCS-OSS determines whether the target element is similar during step 233. Upon finding the target element is similar, then step 234.1 is executed and the user is prompted to confirm the element identification before the DCS-OSS system 22 initiates downloading during step 234.2. Thereafter, program execution branches to step 240.

Upon finding that the target element is not the same or even similar during steps 231 and 233, respectively, the DCS-OSS 22 of FIGS. 1 and 2 determines whether the identified target is the user's terminal or PC (step 235). If not, the program execution branches back to step 230, prompting the user to re-identify the target. Otherwise, the user is prompted to confirm the element identification during step 236.1 before the DCS-OSS system initiates downloading during step 236.2. Thereafter, program execution branches to step 240.

The foregoing discloses a technique for achieving restoration of a network element, such as digital cross-connect system.

The above-described embodiments merely illustrate the principles of the invention. Those skilled in the art may make various modifications and changes that will embody the principles of the invention and fall within the spirit and scope thereof.

What we claim is:

1. A method for providing restoration data for network elements, comprising the steps of:

receiving from each network element an update indicative of a configuration change as such change occurs;

establishing, for storage in a database, a restoration map for each element in a language corresponding to that element and revising said map in accordance with each update as configuration changes occur;

querying the database storing the restoration maps to obtain an associated map for a selected network element;

directing said associated restoration map for ultimate receipt by the selected network element; and restoring said selected network element in accordance with the said associated map.

2. The method according to claim 1 wherein the restoration map is directed directly to the selected network element.

3. The method according to claim 1 wherein the restoration map is first directed to an intermediate element and then directed from said intermediate element to the selected element.

4. The method according to claim 1 wherein the restoration map is directed to a target element on which service is restored in place of the selected element.

5. The method according to claim 1 wherein the restoration map provides partial restoration.

6. The method according to claim 1 wherein the restoration map provides full restoration.

7. The method according to claim 5 wherein the restoration map provides restoration of a selected set of circuits.

8. The method according to claim 7 wherein the set of circuits is selected by a user.

* * * * *